United States Patent

[11] 3,615,181

| [72] | Inventor | William C. Bauman |
| | | Midland, Mich. |
| [21] | Appl. No. | 852,339 |
| [22] | Filed | Aug. 22, 1969 |
| [45] | Patented | Oct. 26, 1971 |
| [73] | Assignee | The Dow Chemical Company |
| | | Midland, Mich. |

[54] PROCESS FOR PRODUCING SOLUTIONS OF MAGNESIUM VALUES
15 Claims, 1 Drawing Fig.

[52] U.S. Cl. .................................................. 23/91,
23/50, 23/312
[51] Int. Cl. .................................................. C01f 5/30,
C01f 5/26
[50] Field of Search .................................... 23/91, 309,
50, 312 AH, 312, 312 A, 89, 90; 252/364

[56] References Cited
UNITED STATES PATENTS
2,381,994   8/1945   Belchetz ................... 23/91

| 2,387,898 | 10/1945 | Grebe et al. ................... | 23/91 |
| 2,671,714 | 3/1954 | McIlhenny et al. ............ | 23/91 |
| 3,241,915 | 3/1966 | Moolenaar ..................... | 23/91 |

Primary Examiner—Edward Stern
Attorneys—Griswold & Burdick, William R. Norris and Lloyd S. Jowanovitz ABSTRACT: Disclosed herein is a process for providing relatively pure and concentrated aqueous solutions of magnesium values, e.g. MgCl$_2$. The process comprises contacting sea water or similar dilute and impure solutions of magnesium values, with a cation-type ion exchange resin. Aqueous brine is subsequently exchanged with the resin to provide an aqueous brine solution of magnesium values. This solution is contacted with a water-immiscible organic phase comprising an organic acid and an amine. Magnesium values are thereby extracted into the organic phase. Subsequently the organic extractant phase is contacted with an aqueous stripping medium, e.g. water, to provide a relatively pure solution containing up to about 20 weight percent magnesium values.

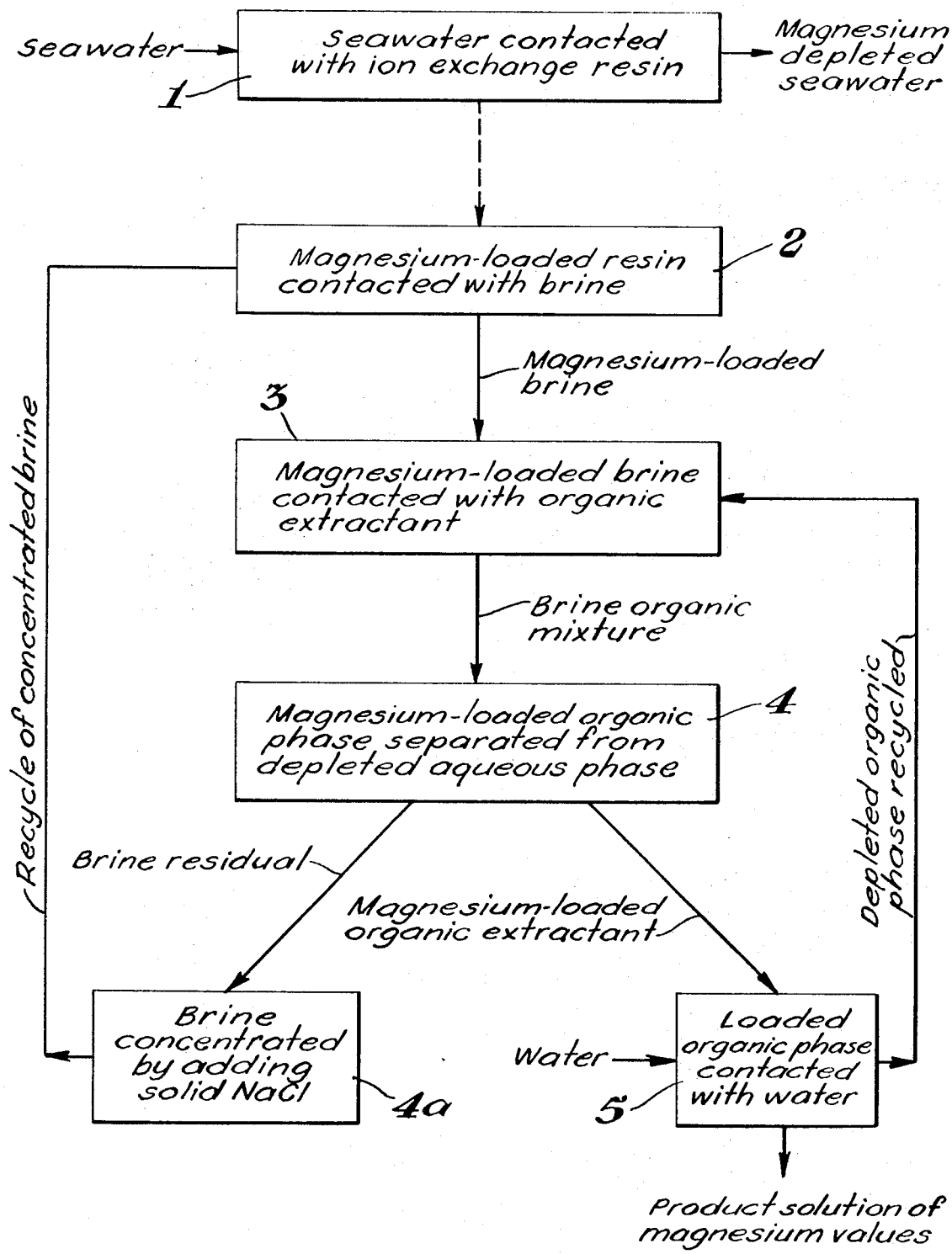

PROCESS FOR PRODUCING SOLUTIONS OF MAGNESIUM VALUES

BACKGROUND OF THE INVENTION

The objective of the present invention is to produce relatively pure and concentrated aqueous solutions of magnesium values from relatively impure and dilute aqueous solutions of magnesium values such as seawater. Toward this end, it is known in the art of ion exchange that certain exchange resins, notably the sulfonic acid-based resins, will extract magnesium ions from aqueous solutions thereof. However, ion exchange methods are subject to undesirable equilibrium conditions which generally limit the concentration of magnesium values in the product solutions to a maximum of about 6 percent.

The art of liquid-liquid extraction has also been proposed for producing magnesium values from relatively dilute aqueous solutions thereof. For example, it is known that if an organic phase consisting of a carboxylic acid and a primary amine carried in toluene is contacted with an aqueous solution comprising magnesium values and impurity metal values, the magnesium values will be preferentially extracted into the organic phase. The methods of liquid-liquid extraction are somewhat disadvantageous, however, when the source of magnesium values is a relatively dilute solution thereof such as seawater. In such situations, the volumes of liquids which must be handled are prohibitive.

Unexpectedly it has been discovered that the techniques of ion exchange and solvent-solvent extraction can be combined with great advantage to provide a novel process for extracting magnesium values from relatively dilute aqueous solutions of the magnesium values, such as seawater.

The drawing is a schematic representation of an embodiment of the present invention.

DESCRIPTION OF THE INVENTION

In the following description of the invention, the term "-values" as used in conjunction with magnesium, is intended to refer to salts of magnesium present in aqueous solutions. The term "ion exchange resin" refers to resins having the capacity to exchange cations. For convenience these resins are sometimes referred to hereinafter, as "cation" exchange resins. The term "contacting" as used hereinbelow refers to, and is intended to encompass methods of obtaining intimate admixture between liquids, such as countercurrent contacting, mixer-settlers, emulsifiers, and mixers. The term is also used to describe contact between a liquid and an ion exchange resin. Such contacting includes for example passing liquid through a column packed with the resin, or dispersing the resin into a bath of the liquid followed by filtration. The term "contacting" is further intended to encompass both batch-type and continuous processes, i.e., in the present process all contacting steps can be carried out on a batch-type basis or in a continuous manner. At this point, reference should also be had to the term "water-immiscible." As employed herein, this term indicates those species of organic materials generally having at least four carbon atoms and which are relatively insoluble in water. Such insolubility is usually of such an extent that intimate contacting between the organic material and water results in solubilization in the aqueous phase of less than about 0.1 percent by weight of the organic material.

The present invention is a process comprising contacting an aqueous source solution of magnesium values with a cation exchange resin, thereby sorbing magnesium ions onto the resin. The magnesium-loaded resin is subsequently contacted with aqueous brine sufficiently concentrated with regard to dissolved inorganic salts (e.g. NaCl, $Na_2SO_4$, KCl and $CaCl_2$) to cause the desired degree of exchange of magnesium cations for other metal cations of the brine, e.g. sodium. The resulting aqueous brine solution of magnesium values is contacted with a water-immiscible organic extractant liquid thereby to extract magnesium values into the organic phase. Subsequently the organic phase is contacted with an aqueous stripping medium to provide an aqueous solution of magnesium values. If desired, this aqueous solution can be subsequently processed by conventional technology to provide metallic magnesium.

Aqueous source solutions for magnesium values can contain a wide range of materials. For example, where the aqueous source solution is seawater, the cations of sodium, potassium, magnesium and calcium will generally be present. Halide anions such as chloride, bromide and iodide will also be present. The concentration of magnesium cation in the source solution should be at least 200 parts per million (p.p.m.) and preferably should be at least 1,000 p.p.m.

The ion exchange resin can be any of the sulfonic acid resins commercially available for sorbing cations from aqueous solution. Generally the resin will be a sulfonic-acid-type resin in either the sodium or acid form. Examples of such exchange agents are the resinous condensation product of formaldehyde and phenol sulfonic acid, materials obtained by sulfonating the resinous condensation products of formaldehyde with phenol or other monohydric or polyhydric phenols, the sulfonated resinous copolymers of monovinyl- and polyvinylaromatic compounds such as of styrene and divinylbenzene, of nuclear methylated styrene and divinylbenzene, of chlorostyrene and divinylbenzene, and of styrene, ethyl vinylbenzene and divinylbenzene. Additionally macroreticular sulfonated polyvinylaromatic resins such as the "Amberlite 200" brand resins (a product of Rohm and Haas Co.) can be employed.

Preferably the resin will consist of the sulfonated copolymers of styrene cross-linked with from 2 to 16 percent by weight of divinylbenzene. Suitable resins are for example the "DOWEX 50" and "DOWEX 50W" brand sulfonic acid resins produced by The Dow Chemical Company.

As described above, the ion exchange resin is contacted with an aqueous source solution for magnesium ions. The magnesium-loaded resin is then contacted with a brine solution to exchange metallic ions of the brine for sorbed magnesium ions. In contacting the resin with either the source solution of Mg ions or the brine solution, the rate of contacting can very greatly. Numerous commonly employed methods of contacting are also feasible. For example, contacting by either upflow or downflow through beds of the resin is possible. Contacting can also be carried out by dispersing the resin in the contacting liquid and thereafter separating the resin by filtration.

The rate and degree of exchange generally depend largely upon the concentration of inorganic metal salts, e.g., NaCl, KCl, $CaCl_2$, and $NaSO_4$ in the brine, with the rate and degree of exchange being increased as the concentration of nonmagnesium inorganic values in the brine increases. Therefore it is preferred that the brine be substantially saturated with respect to the nonmagnesium inorganic salts. Preferably, the major nonmagnesium salt present will be sodium chloride. A highly suitable brine therefore is seawater which has been concentrated (as by addition of solid NaCl) to increase the NaCl content thereof. Another suitable brine is that formed by solution mining (with water) of natural NaCl from salt domes or evaporites.

The brine solution of magnesium (prepared as described above) is contacted with a solution of an organic acid and an amine carried in an organic solvent. The extractant components (acid and base) and the solvent are water-immiscible. Such mixtures usually comprise from about 20 to about 65 weight percent (based on the total solution) of the extractant components as solute. Preferably the extractant components comprise from about 35 to about 60 weight percent of the solution.

The relative volumes of the contacted aqueous and organic extractant phases will depend on such parameters as concentration of the organic acid and base in the organic phase, and concentration of magnesium values in the aqueous phase. Generally efficient contacting will be achieved if a volumetric excess of the organic phase is employed. For example, assuming that the concentration of magnesium values in the aqueous phase is from about 5 to about 8 percent by weight, and that the concentration of the extractant components in the organic phase comprises from about 35 to 60 weight percent thereof, the volumetric ratio of the organic phase to aqueous phase should be from about 2 to about 10, and preferably should be from about 3 to about 7.

In carrying out the present novel process, the pH of both the organic and aqueous phases during contacting is maintained within the range of from about 1 to about 8. Above a pH of about 8, there is a tendency for basic hydroxides to begin precipitation from solution.

Following the extraction step with the organic solvent, the system generally separates into two phases upon cessation of agitation, and the magnesium-loaded organic phase can be conveniently separated by decantation or similar means from the magnesium-depleted aqueous phase. The depleted aqueous phase can be reconstituted with respect to the salt content thereof and can be recirculated into contact with the exchange resin.

The separated, loaded organic extractant phase is subsequently contacted with an aqueous stripping medium, e.g. water, or dilute acids. The extracted magnesium values are thereby transferred into the aqueous phase. If desired, the depleted organic phase can be recycled into contact with the brine solution of magnesium values, for further extraction.

Usually, the organic extractant is prepared by mixing equimolar quantities of the amine and acid. Formation of a reaction product is evident by heat evolution and a temperature rise in the mixture. Conveniently, the preparation of the extractant can be carried out in the presence of a diluent or solvent thereby to provide directly a solution of the extractant which can be used in the practice of the process of the invention.

Referring now to the drawing and the specific embodiment of the invention depicted therein, in step 1, seawater is contacted with a sulfonic-acid-type cation exchange resin thereby to sorb magnesium cations onto the resin. In step 2, the magnesium-loaded resin is contacted with an aqueous solution of sodium chloride to cause magnesium cations to transfer from the resin to the aqueous brine phase. This contacting step also serves to regenerate the sodium form of the resin which can then be reused to recover magnesium from seawater.

The "dotted" line between the boxes of steps 1 and 2 is employed to indicate that steps 1 and 2 can be performed in the same vessel, i.e. a vessel containing a bed of the resin. Optionally, a flow of materials could also take place between steps 1 and 2 as where the magnesium-loaded resin is dispersed in the brine of step 2. In such a case steps 1 and 2 could be connected with an "arrow" as in the remaining steps of the process where there is a flow of materials in connection with each step.

The aqueous brine solution of magnesium values is contacted (step 3) with a water-immiscible organic phase containing an organic acid and an amine with the magnesium values being extracted into the organic phase. The aqueous and organic phases are separated (step 4). The magnesium-depleted aqueous phase is then saturated with NaCl (step 4a) and is recycled into contact with a magnesium-loaded exchange resin. The magnesium-loaded organic phase is contacted with water (step 5) to provide a relatively pure aqueous solution of magnesium values. The magnesium-depleted organic phase is then recycled into contact with an aqueous brine solution of magnesium values.

Organic acids suitable for use as a component of the mixed organic extractant are the substantially water-insoluble and/or water-immiscible carboxylic acids having a total carbon content of at least about four and preferably from about eight to about 16, monoalkyl substituted phosphoric acids wherein the alkyl group has a total carbon content of at least about four and preferably from about eight to about 16, and water-immiscible sulfonic and phosphonic acids, and phenols, which for present purposes are considered acids. Long chain straight and branched chain aliphatic carboxylic acids having a total of from about eight to 13 carbon atoms have been found to be particularly effective.

Illustrative examples of substantially water-immiscible organic acids suitable for use in the practice of the present invention are butanoic, hexanoic, 2,4-dinitrophenol, 2-ethylhexanoic, α-hydroxy caprylic, α-bromocaprylic, mandelic, phenylacetic, 2-amino octanoic, Versatic aliphatic carboxylic acids having from about nine to about 15 carbon atoms, isodecanoic, neodecanoic, 2,6-dinitro-p(t-butyl)phenol, neotridecanoic, 2-(p-tert-butylphenoxy)propionic, benzilic, dodecenylsuccinic, α-hydroxystearic, naphthenic (cycloalkyl carboxylics) such as cyclohexlcarboxylic, 4-sec-butyl-2-(α-methyl benzyl)phenol; bis(2-ethylhexyl)phosphoric, and dinonylnaphthalene sulfonic acid.

Substantially water-insoluble and water-immiscible primary, secondary, tertiary and quaternary amines having a total carbon content of at least about six, and preferably from about eight to about 18, can be used as the amine component of the mixed extractant. For most operations, quaternary or primary amines are preferred since these exhibit increased efficiencies in the mixed extractant over that shown by the secondary or tertiary amines.

Illustrative amine components are represented by hexylamine, triethylamine, octylamine, 2-benzyl pyridine, dicyclohexylamine, "Primene" brand long chain aliphatic primary amines, di-2-ethylhexylamine, N,N-dibenzyl ethanolamine, "Arquad" brand quaternary ammonium salts having one or more alkyl groups ranging in chain length from about $C_8$ to about $C_{18}$, "Aliquat" brand quaternary ammonium salts derived from fatty acid amines, 1,1,3,3-tetramethyl butylamine, "Alamine" brand tricaprylylamines, N-methylcyclohexylamine, and N,N-diethylcyclohexylamine.

Substantially water-immiscible organics having both amines and acid moieties in the same molecule also are suitable for use as extractants in the practice of the present invention. Illustrative examples are 2-(4-nonyl-1(2H)-pyridyl) butyric acid,

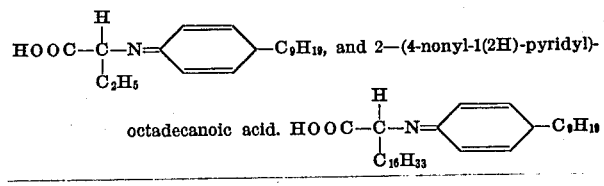

octadecanoic acid.

chain secondary aliphatic amines containing carboxylate groups.

Substantially water-immiscible alcohols, esters, ketones, hydrocarbons, halogenated hydrocarbons and the like organic liquids which possess the requisite solvent properties are suitable for use as solvents for the mixed organic acid-amine extractant in the practice of the process of the present invention. In general, the selection of a particular solvent or solvent mixture for use in an actual extraction operation will be determined so as to assure that it exhibits the requisite solubility characteristics and does not detrimentally interact with, i.e. react with or otherwise adversely influence, the other components of the extractant mixture under the operating conditions.

Solvents which have been found to be particularly suited for use in the practice of the present invention are toluene, kerosene, aromatic hydrocarbons, butanol, octanol, methyl isobutyl ketone, and benzonitrile.

The following example will serve to illustrate the present invention. The ion exchange resin employed is a sulfonic acid derivative of a cross-linked polyvinyl-aromatic resin.

The sodium form of the resin is contacted with an excess of seawater to load about 30–40 percent of the exchange groups with magnesium ion. About 8–10 percent of the groups are loaded with calcium ion, and about 3–4 percent with potassium ion. The remainder are loaded with sodium ion.

The loaded resin is contacted countercurrently with saturated NaCl brine. With efficient contacting, the resulting brine solution will contain (by weight) as much as 8% $MgCl_2$, about 2% $CaCl_2$, and about 0.9% KCl, with the NaCl concentration being about 12%.

One volume of the product brine solution is contacted (usually in countercurrent fashion) with about 5 volumes of a toluene solution containing about 1 mole/liter of a primary amine such as 1,1,3,3-tetramethylbutylamine, or a primary aliphatic amine having from 12 to 24 carbon atoms with the amine group being linked to a tertiary carbon atom and about 1 mole/liter of naphthenic acid. The $MgCl_2$ and $CaCl_2$ are removed from the brine, while leaving most of the NaCl and KCl in the aqueous phase. If desired, the depleted brine can be resaturated with NaCl and reused to regenerate the resin.

One volume of the loaded toluene mixture is contacted countercurrently with about 1/10 volume of water to produce a brine solution containing about 16 weight percent $MgCl_2$, 4 weight percent $CaCl_2$, and minor amounts of KCl and NaCl. The depleted toluene mixture is recycled to extract more $MgCl_2$.

What is claimed is:

1. A process comprising (a) contacting a cation type ion exchange resin with an aqueous solution comprising at least 200 p.p.m. of magnesium ions thereby to sorb the magnesium cations onto the resin; (b) contacting the magnesium-loaded resin with an aqueous brine solution wherein the concentration of nonmagnesium inorganic salts is sufficiently high to displace magnesium ions from the resin into the aqueous brine; (c) contacting the resulting aqueous brine solution of magnesium values with a water-immiscible organic extractant comprising an inert liquid carrier and organic acid and amine moieties, with the combined weight of the organic acid and amine extractants being from about 20 to about 65 weight percent of the extractant phase and with the pH of both the organic and aqueous phases being controlled within the range of from about 1 to about 8, thereby to extract magnesium values into the organic phase; and (d) contacting the magnesium-loaded organic phase with an aqueous stripping medium thereby to form an aqueous solution of magnesium values.

2. The process as defined in claim 1 wherein the water-immiscible extractant liquid is a solution of an organic acid and an amine in a substantially water-immiscible organic liquid, said liquid serving as a solvent for said members and not detrimentally interacting therewith under operating conditions.

3. A process as in claim 1 wherein the aqueous stripping medium of step (d) is water.

4. A process as in claim 2 wherein the organic acid is a member of the group of water-immiscible carboxylic acids having a total carbon content of at least four, and monoalkyl substituted substituted phosphonic acids wherein the alkyl group has a total carbon content of at least about four.

5. A process as in claim 1 wherein the organic acid is a member of the group of water-immiscible carboxylic acids having a total carbon content of from about eight to about 16 atoms, and monoalkyl substituted phosphoric acids wherein the alkyl group has a total carbon content of from about eight to about 16.

6. A process as in claim 1 wherein the organic acid is an aliphatic carboxylic acid having a total of from about eight to about 18 carbon atoms.

7. A process as in claim 1 wherein the organic acid is a carboxylic organic acid and the amine member contains primary amine groups.

8. A process as in claim 1 wherein the aqueous solution comprising magnesium ions which is contacted with an ion exchange resin in step (a) of claim 1, is seawater.

9. A process as in claim 1 and including the step of recirculating the magnesium-depleted organic extractant phase formed in step (d) of claim 1, into contact with an aqueous brine solution of magnesium values as formed in step (b) of claim 1.

10. A process as in claim 1 wherein the aqueous brine solution employed in contacting the magnesium-loaded ion exchange resin in step (b) is substantially saturated with respect to nonmagnesium inorganic salts.

11. A process as in claim 9 wherein the aqueous brine solution is an aqueous solution of sodium chloride.

12. A process as in claim 1 wherein the ion exchange resin is a sulfonic acid derivative of a cross-linked polyvinylaromatic resin.

13. A process as in claim 1 where, in the organic extractant phase of step (c), the total concentration of the organic acid and amine extractants taken together is from about 35 to about 60 weight percent of the total weight of the organic extractant phase.

14. A process as in claim 1 where, in the organic extractant phase of step (c), the organic acid and amine are present in about equimolar amounts.

15. A process as in claim 1 wherein, in the organic extractant phase of step (c), the amine and acid moieties are both present in the same molecule.

* * * * *